May 23, 1961     H. SCHICHT     2,984,956
METHOD FOR LAPPING GEARS TO CORRECT TOOTH BEARING SURFACES
Filed May 28, 1956     5 Sheets-Sheet 1
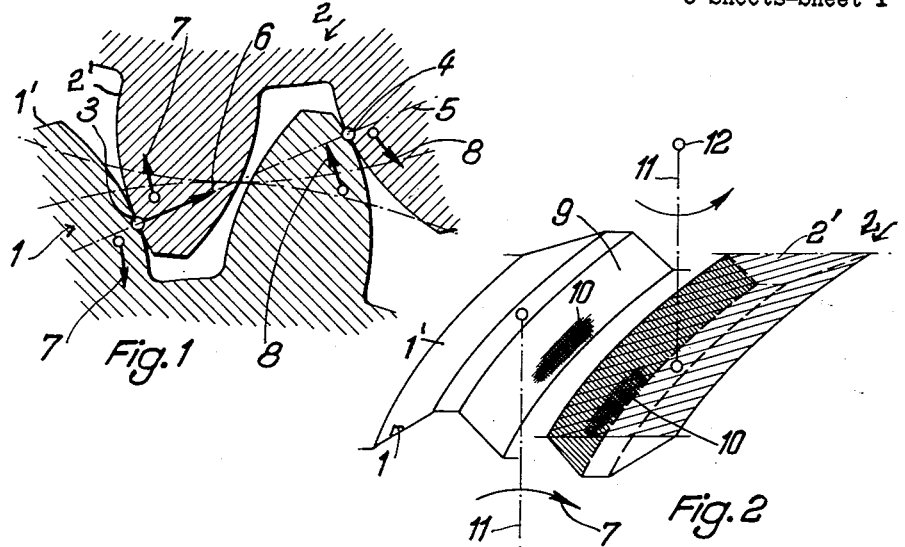
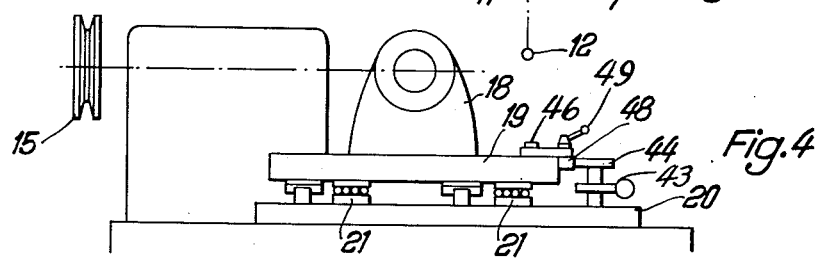
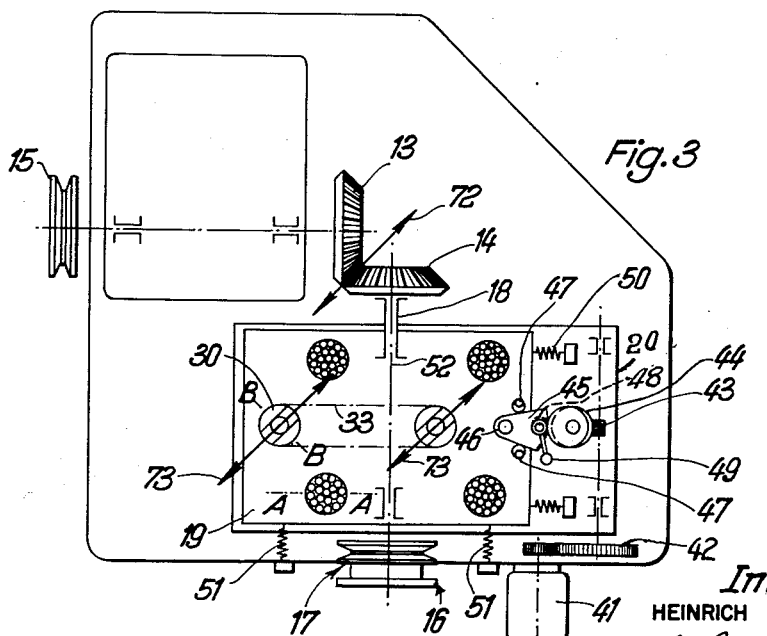
Inventor:
HEINRICH SCHICHT May 23, 1961 H. SCHICHT 2,984,956
METHOD FOR LAPPING GEARS TO CORRECT TOOTH BEARING SURFACES
Filed May 28, 1956 5 Sheets-Sheet 2
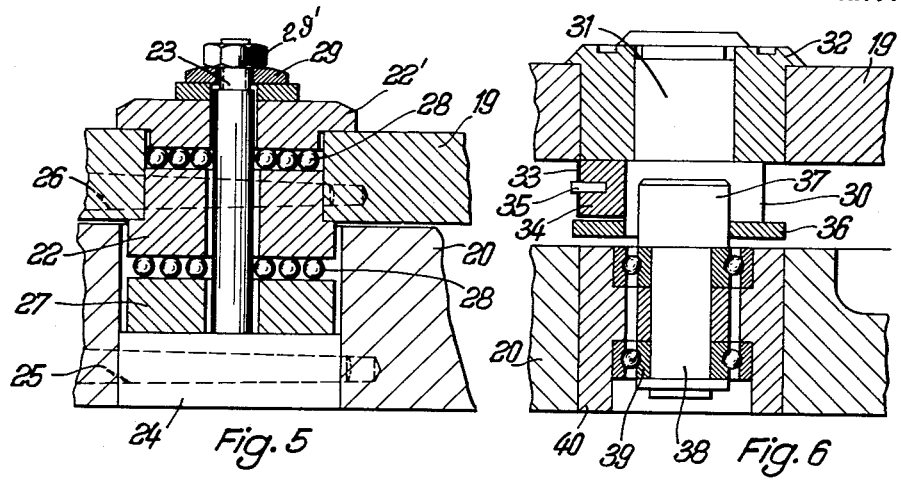
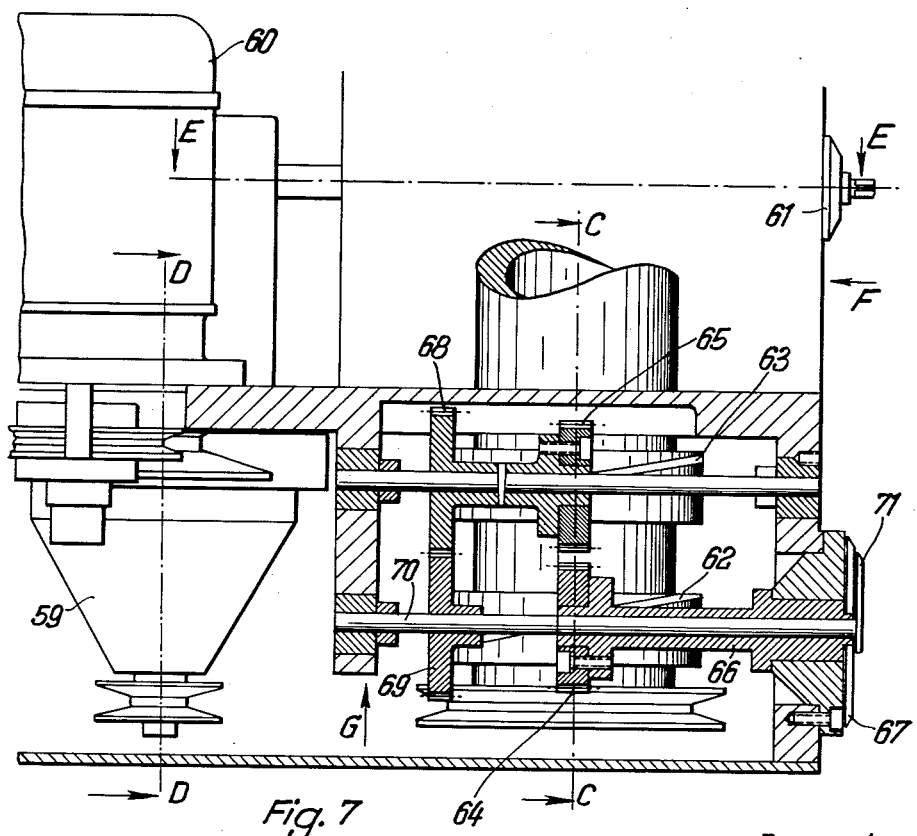
Inventor:
HEINRICH SCHICHT
BY Mead, Browne,
Schuyler & Beveridge
ATTORNEYS

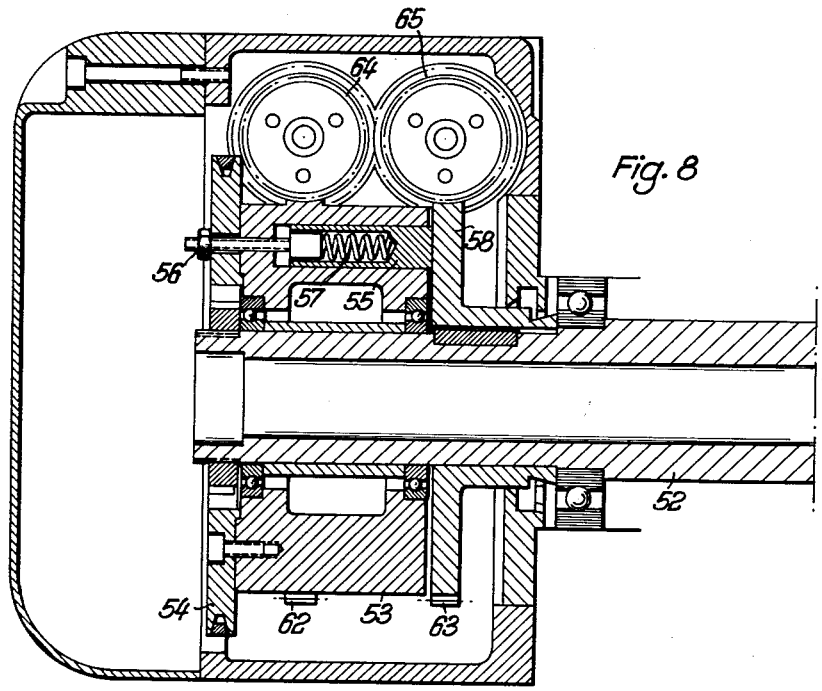
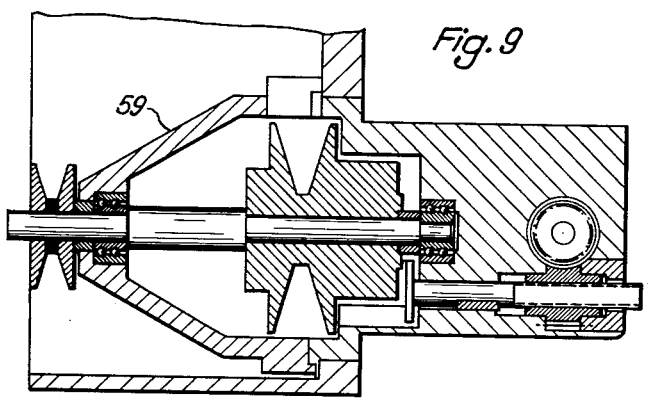

Inventor:
HEINRICH SCHICHT

United States Patent Office 2,984,956
Patented May 23, 1961

2,984,956

METHOD FOR LAPPING GEARS TO CORRECT TOOTH BEARING SURFACES

Heinrich Schicht, Huckeswagen, Rhineland, Germany, assignor to W. Ferd. Klingelnberg Sohne, Remscheid-Berghausen, Germany, a corporation of Germany Filed May 28, 1956, Ser. No. 587,667

4 Claims. (Cl. 51—287)

This invention relates to a method for lapping the teeth of a gear to obtain desired contact characteristics.

The tooth flanks of a gear are only in rare cases in contact with those of the mating gear over the full surface. The contact area is as a rule smaller due to machining and installation errors or to intentional tooth form corrections. This effective contact area is termed tooth bearing. The lapping of gears is not merely concerned with providing a smooth finish on the flanks but also with creating a good bearing between the teeth of the mating gears. Small deviations from the ideal bearing caused by machining distortion through heat treatment or flexibility in installation should be eliminated by lapping and allowed for in advance. This is, however, an extremely difficult task. It is essential to take into account that the relative movements of the mating gear flanks which also govern the extent of the lapping effect, cannot be freely selected as, for example, when lapping a surface. The movements are, in fact, governed by the machining process with its constantly varying sliding speeds.

Accordingly, it is an object of this invention to provide an improved method for lapping gears to improve the bearing contact between mating gears.

It is another object of this invention to provide a method for lapping gears in which the lapping action takes place with a "push" sliding action to more effectively correct the bearing contact of the gears.

In achievement of these objectives, there is provided in accordance with this invention an apparatus for lapping two mating gears including a separate drive means for each of the mating gears. One of the gears is driven by an infinitely variable unit which permits the speed of that gear to be adjusted to any desired value either faster or slower than that of the mating gear. By properly adjusting the speed of the infinitely variable drive unit either gear can be made to become the driving or driven gear, as desired, and as required by the location on the tooth flanks of the bearing surfaces requiring correction so as to apply "push" sliding action between the mating flanks in the areas requiring correction. An indicator device responsive to the differential between the speeds of the drive means for the two respective gears is provided, thereby indicating which of the gears is acting as the driving gear. As a further feature of the method and construction, at least one of the mating gears is mounted on a table which can be rocked intermittently to provide additional sliding motion at any desired angle in a horizontal plane between the two mating gears during the lapping operation.

Further objects and advantages of the invention will become apparent from the following description taken in conjunction with the accompanying drawings in which:

Figure 1 is a view in side elevation of a pair of gears in mesh with each other showing the line of contact between the gears;

Figure 2 is a perspective view of two of the meshing teeth of the gears of Figure 1;

Figure 3 is a top plan view of a gear lapping machine in accordance with the invention;

Figure 4 is a front elevation view of the machine of Figure 3;

Figure 5 is a view in vertical section along line A—A of Figure 3;

Figure 6 is a view in vertical section along line B—B of Figure 3;

Figure 7 is an enlarged elevation view partially in section, of the indicator unit of the apparatus;

Figure 8 is a view in vertical section along line C—C of Figure 7;

Figure 9 is a view in vertical section along line D—D of Figure 7;

Figure 10:
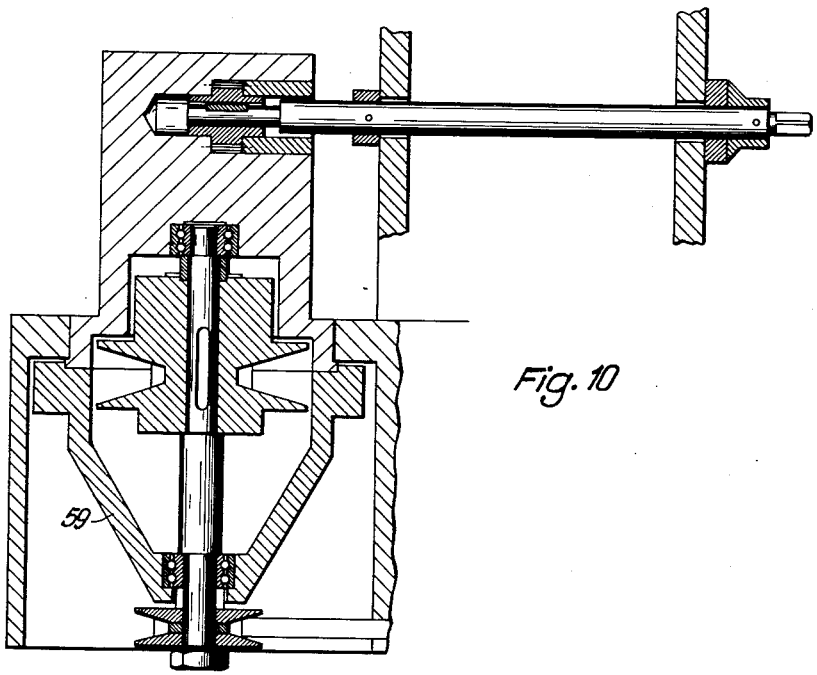
Figure 10 is a view in horizontal section along line E—E of Figure 7.
Figure 11:
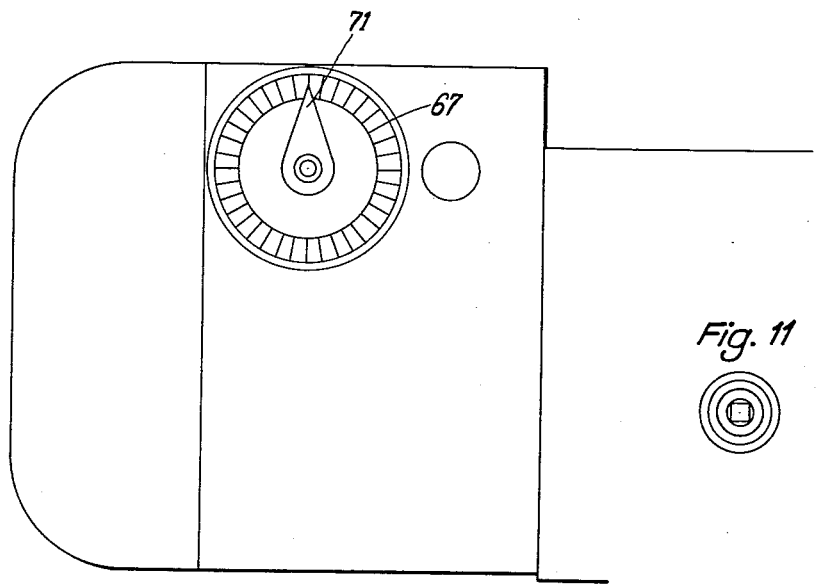
Figure 11 is a side elevation view in the direction F of Figure 7.
Figure 12:
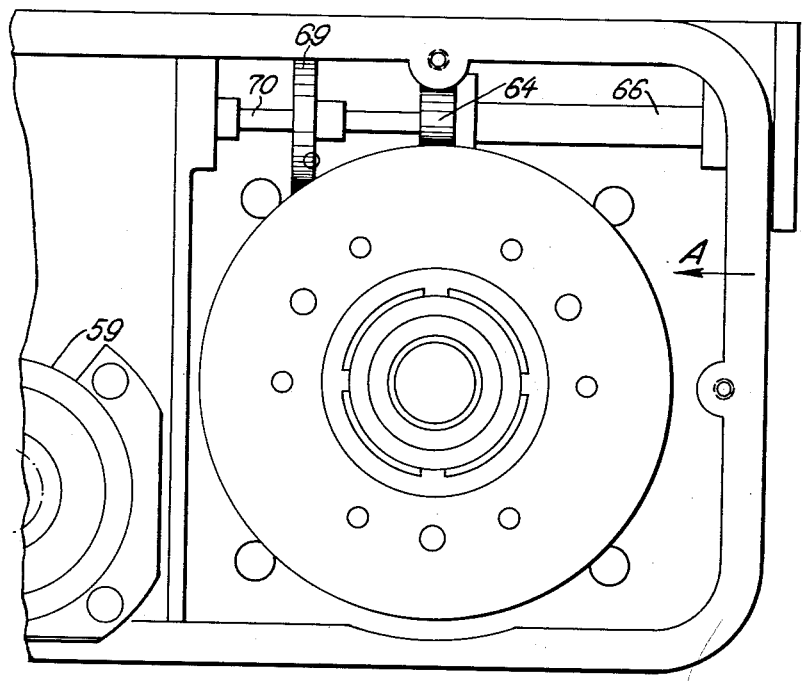
Figure 12 is a bottom plan view in the direction G of Figure 7, with cover removed.

This invention is based on the realization arrived from observation that during gear lapping the surface of the mating tooth flanks tends to be removed more rapidly in those areas where the flanks make so-called "push" sliding contact then in the zones where pull sliding contact occurs. In utilizing the method and apparatus of the invention, the direction of rotation and direction of flank pressure are so selected that the flank zones where the bearing surface is to be lapped is preferably in push sliding contact with the mating gear. Accordingly, a simple rule derived from this fact in accordance with a characteristic feature of the new method is that the pressure effecting the flank contact is exerted by that gear whose tooth bearing derived from this pressure with the mating gear requires a correction from the tooth dedendum to the addendum. In other words, the driving gear of two mating gears which are being lapped should preferably be the gear whose tooth bearing requires a correction in the region lying in the dedendum while the driven gear is that gear whose tooth requires correction in the addendum region.

While with conventional lapping methods the gears usually run for a certain time in one direction and then in the other, the method of the present invention requires at times a change in the sequence of movements. It also comprises a machine which performs additional movements, such as a longitudinal sliding movement of the gears being lapped, with any ratio of gears to be lapped, and if bevel gears are involved, in the direction of the crown wheel plane or at a definite angle to it. The method of the present invention is, therefore, performed on a machine having straight guides for supporting one or both gears which carry out the additional movements. The guides can be swivelled around an axis arranged at right angles to the guides.

Referring now to the drawings and more particularly to Figure 1, the contact relations between a pair of mating gears are illustrated in Figure 1. Gear 1 drives gear 2. The tooth of the driving gear commences engagement with the dedendum (point 3) and ends with the addendum (point 4). The so-called line of contact, i.e., the line on which the flanks of the driving and driven gear make contact between the starting point 3 and finishing point 4 is indicated by dotted line 5. The direction of movement is indicated by the arrow 6. At the start of the engagement, namely at point 3, the teeth of the two mating gears push against one another. The sliding of the flanks takes place toward the tooth dedenda of both mating gears as shown by the arrows 7. Sliding in this direction is known as "push" sliding. At the end of the engagement, the teeth move apart and sliding takes place in the direction of the arrows 8 or toward the addendum of each of the mating gear teeth. This sliding is known as "pull" sliding. Observation has shown that those parts of the flanks are ground off more quickly during lapping which are within the push sliding zone. As mentioned previously, the method and apparatus of the invention permits the selection of that direction of rotation and distribution between the driving and driven gear which leads to a push sliding on the teeth. In order to simplify the rule it is also possible to dispense with specifying the pull and push sliding or the gear which is to be the driving member if instead it is specified in which direction the pressure 7 giving the flank thrust is exerted by that gear whose tooth bearing resulting from this pressure with the mating gear 2 requires a bearing surface correction from dedendum to addendum.

A further illustration of this rule is provided by Figure 2 in which the teeth 1' and 2' of Figure 1 are shown in perspective. In the case of the tooth flank 9 of tooth 1' the shaded area 10 represents the tooth bearing which is to be corrected by lapping, while the shaded area 10 on tooth 2' indicates the corresponding tooth bearing surface which is to be corrected by lapping on tooth 2'. Since the bearing contact areas 10 of the respective teeth 1' and 2' are respectively in the dedendum portion of tooth 1' and in the addendum portion of tooth 2', push sliding pressure 7 required to correct these misplaced bearing surfaces is provided by having the flank thrust exerted by gear 1, or, in other words, by having gear 1 the driving gear and gear 2 the driven gear as shown in Figure 1. If the bearing to be corrected on the tooth were in the addendum region, such as point 4 of Figure 1, then to provide the necessary push sliding action in this region it is necessary that gear 2 be the driving gear.

The lapping machine of the invention is shown in Figures 3 and 4 and is designed for the lapping of mating bevel gears 13 and 14. Gear 13 is driven through a V rope pulley 15 by an electric motor not shown in the drawing. Gear 13 drives the gear 14 which can be braked or accelerated by a friction disk designated generally 16 connected to a V rope pulley designated generally 17, both disk 16 and pulley 17 being schematically represented in Fig. 3. V rope pulley 17 is driven by an electric motor which is not shown in the drawing. Gear 14 is carried by a spindle 52 supported in bearings carried by pedestal bearing bracket members 18. Brackets 18 are mounted on a table 19 which in turn is supported by a base plate 20.

The connection of table 19 to base plate 20 is best seen in the view of Figure 5. A cylinder 22 is secured to table 19 by a tangential key 26 to prevent turning of cylinder 22 relative to table 19. A screw 23 having a cylindrical head 24 extends through cylinder 22. Screw head 24 is secured to base plate 20 by a tangential key 25 to prevent turning of screw 23 and screw head 24 relative to base plate 20. A cover member 22' is positioned coaxially about screw 23 and has a flange portion which seats on the upper surface of table 19. Steel balls 28 are interposed between the facing surfaces of cover 22' and cylinder 22. A second cylinder 27 is coaxially positioned about screw 23 below cylinder 22 and is seated on the upper surface of cylindrical screw head 24. The facing surfaces of cylinders 22 and 27 are separated by steel balls 28. A spring washer 29 is interposed between a nut member 29' and cover 22', nut 29' serving to hold the members just described in assembled relation. Screw member 23 has ample play in cylinder 22, while cylinders 22 and 27 have free movement with respect to base plate 20. The relative movements which are imparted to table 19 with respect to base plate 20 by the mechanism to be described are smaller than the play which is available between these members.

In order to permit additional movements to be imparted to gear 14 during the lapping operation, such as a longitudinal sliding movement, table 19 is supported with respect to base plate 20 in a manner which permits the additional movement to be provided in the desired direction. Thus, as best seen in Figure 6, a straight slotted guide member 30 is integral with the pivot 31 which in turn is attached to cylinder member 32. Cylinder member 32 is swivelly mounted in table 19 and can be rotated to move the straight slotted guide member 30 to any desired angle in a horizontal plane. A cylindrical spigot 37 carried by base plate 20 engages slotted guide 30. The reduced end 38 of spigot 37 is supported by antifriction bearings 39. Antifriction bearings 39 are mounted in a bushing 40 carried by base plate 20.

Two slotted guide members 30 are carried by table 19 in spaced relation as best seen in view of Figure 3 and the two spaced guide members 30 are connected together by an endless band 33 which is secured by a pin 35 to a key 34 carried by each guide 30. Thus the provision of the connecting band 33 which is secured to each of the straight guides 30 ensures that a given angular movement imparted to one of the guide members 30 will be communicated to the other guide member 30 so that both guide members will be adjusted to the same angular position.

Figure 14:
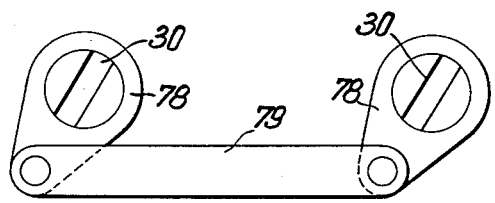
Figure 14 is a top plan view of a modified connection between two guide members using a connecting rod.

The endless band 33 shown in Figure 6 can be replaced by the construction shown in Figure 14 in which the two spaced straight guide members 30 are each provided with a lever member 78, with the two levers 78 being connected by a push rod 79. Thus, if one of the guide members 30 is moved to a certain angular position, the other guide member will assume the same angular position.

The additional movement of the work head 18 and table 19 is derived from an electric motor 41 through reduction gearing 42 which drives a worm member 43 which in turn rotates a cam 44. Cam 44 engages a push rod 45 pivotally joined to table 19 by pin 46. Push rod 45 can move to the left and right of the center position about pivotal axis 46. The pendulum movement of push rod 45 to either side of its axis is limited by the oppositely disposed eccentric stop pins 47 which can be turned to shorten or lengthen the movement of push rod 45. The outer end of push rod 45 carries an eccentric disk 48 (Figure 4) which can be turned and adjusted manually by the handle 49. The table is biased by springs 50 to hold eccentric disk 48 against cam 44, while springs 51 tend to pull the table toward V rope pulley 17. These springs ensure absence of play in the guides 30.

The arrangement of the friction drive 16 and 17 is best seen in Figures 7 to 12 inclusive. As seen in Figure 8, the spindle 52 of the gear 14 to be lapped carries at its opposite end a friction member 53 which is connected to a V rope pulley 54. Friction member 53 carries slidably movable contact members 55 which bear against a face plate 58 keyed to spindle 52 with a pressure which can be varied by adjustment of studs 56 and springs 57. V rope pulley 54 is driven by an electric motor 60 through an infinitely variable drive unit 59 (Figure 7). A rim worm 62 is provided on the outer circumference of friction member 53 and a rim worm 63 is provided on the outer circumference of face plate 58 carried by spindle 52. Rim worms 62 and 63 respectively engage worm wheels 64 and 65. Worm wheel 64 is connected to a hollow shaft 66 which in turn is connected to a dial 67. Worm wheel 65 drives a shaft 70 having a pointer 71 through a pair of gears 68 and 69. The thread direction of worm spirals 62 and 63 is so selected that if spindle 52 and friction member 53 turn in the same direction dial 67 and pointer 71 will likewise turn in the same direction.

Figure 13:
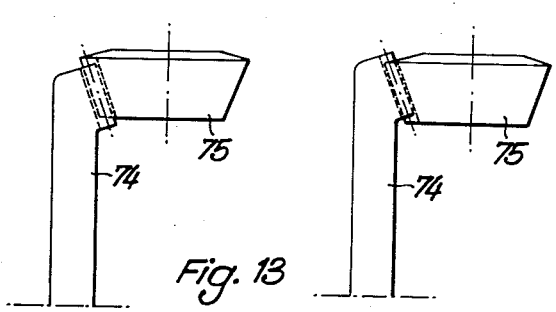
Figure 13 is an elevation view of a pair of mating gears having a longitudinally varying engagement.

The method of operation of the lapping machine is as follows:

The straight guides 30 are set according to the position of the crown wheel before the machine is started up. In Figure 3, the crown wheel lies in the direction of arrow 72. The straight guide 30 is, therefore, set parallel with this direction or in the direction of arrow 73 in Figure 3. If the teeth of the gears are to retain the same position in their longitudinal direction, irrespective of which is to be the driving gear, it is necessary to set stop pins 47 so that push rod 45 swings aside to an equal extent to left and right when the direction of rotation of cam 44 is reversed. This effect is shown in Figure 13 where 74 and 75 indicates a gear and a pinion, respectively. For a given direction of rotation of cam 44, push rod 45 is urged by the cam against only one or the other of stop pins 47. If it is intended to displace teeth of the gear 14 in one case inward relative to the teeth of gear 13 and in another case outward, the eccentric stop pins 47 must be turned to effect a contact such that table 19 is advanced further by cam 44 in one end position than in the other end position. It is possible to move the teeth longitudinally relative to one another and to bring to the desired position, such as flush contact by adjusting handle 49.

The gear 13 or 14 is selected to be the driving member in accordance with the location of the contact area to be corrected in such manner as to provide a push sliding contact in the area being corrected. Thus the gear having the bearing surface to be removed in the dedendum zone should be the driving member as previously explained.

The indicator mechanism previously described provides a means of indicating which of the two gears is the driving gear. If it is desired that gear 13 in Figure 3 be the driving gear then the speed of the rope pulley 17 is made less than that of the pulley 15 by suitable adjustment of the variable drive unit 59. Gear 13 then acts as driving member and the pressure effecting the flank thrust is exerted by this gear. However, if it is desired that gear 14 be the driving gear the speed of pulley 17 is set higher than that of pulley 15, causing gear 14 to become the driving member and the source of the flank pressure. If pulley 17 runs slower than pulley 15, the flank pressure causing the bearing contact correction is derived from gear 13 and pointer 71 driven from spindle 52, face plate 58, worm 63 and worm gear 65 passes dial 67. Conversely, if the flank pressure is derived from gear 14, dial 67 passes pointer 71. The relative speed of pulley 17 as compared to pulley 15 governs the extent of the accelerated or retarded movement of pointer 71 relative to the dial 67. The indicating device thereby renders visible conditions of the gear drive which are otherwise difficult to recognize. The setting of the machine is not carried out according to a rule applicable to all contingencies but is governed by the position of the tooth bearings which are to be improved by lapping.

The scope of the invention is, of course, not confined to the example described which shows the mechanical solution of one problem. The solution could in the same way be effected electrically or hydraulically. In the example illustrated only the spindle of one gear performs the additional movements. However, it is believed apparent to one skilled in the art that, if desired, the spindle of the mating gear may be equipped to perform the additional movements in accordance with the teaching of the present invention.

While there have been shown and described particular embodiments of the invention it will be obvious to those skilled in the art that various changes and modifications may be made therein without departing from the invention and, therefore, it is aimed to cover all such changes and modifications as fall within the true spirit and scope of the invention.

What is claimed is:

1. The method of lapping gears to improve the tooth bearing contact between mating gears which comprises the steps of bringing said gears into mesh, rotating one of said gears, and selectively rotating the other of said gears so that it is either the driving gear or the driven gear of the pair of gears, the driving gear of the pair of gears being so selected that the flank thrust producing the lapping action is produced by that gear of the pair whose resultant tooth bearing when exerting pressure on the mating gear requires a corrective displacement from the dedendum to the addendum.

2. The method of lapping gears to improve the tooth bearing contact between mating gears which comprises the steps of bringing said gears into mesh, selecting as the driving gear that gear whose resultant tooth bearing when exerting pressure on the mating gear requires a corrective displacement from the dedendum to the addendum, rotating the selected gear to drive the mating gear, and simultaneously with rotation of said gears moving one of said gears relative to the other of said gears in a direction having a component of movement parallel to the axis of rotation of the gear being so moved.

3. The method of lapping bevel gears to improve the tooth bearing contact between bevel gears in mesh along a crown wheel plane which comprises the steps of bringing said gears into mesh, selecting as the driving gear that gear whose resultant tooth bearing when exerting pressure on the mating gear requires a corrective displacement from the dedendum to the addendum, rotating the selected gear to drive the mating gear, and simultaneously with such rotation moving one of said bevel gears relative to the other of said bevel gears in the direction of the crown wheel plane.

4. The method of lapping gears to correct radially misplaced tooth bearing surfaces comprising the steps of placing a first gear having a misplaced tooth bearing surface in mesh with a second gear, driving both of said gears in rotation, and regulating the rotation of one of said gears relative to the other of said gears to make said first gear the driving gear when the misplaced bearing surface is on the dedendum portion of said first gear and to make said first gear the driven gear when the misplaced tooth bearing surface is on the addendum portion of said first gear.

References Cited in the file of this patent

UNITED STATES PATENTS

| | | |
|---|---|---|
| 1,562,438 | Copland | Nov. 24, 1925 |
| 1,879,089 | Christman | Sept. 27, 1932 |
| 1,948,071 | Hoffmann et al. | Sept. 20, 1934 |
| 2,147,864 | Thrun | Feb. 21, 1939 |
| 2,445,649 | Turner et al. | July 20, 1948 |
| 2,639,557 | McMullen et al. | May 26, 1953 |